Patented July 19, 1949

2,476,547

UNITED STATES PATENT OFFICE

2,476,547

PREPARATION OF CHLOROTRIAZINYL-NITRILES

Ingenuin Hechenbleikner, Stamford, Conn., assignor to American Cyanamid Company, New York, N. Y., a corporation of Maine No Drawing. Application January 13, 1945, Serial No. 572,754

11 Claims. (Cl. 260—249.5)

This invention relates to new and useful triazines, and more particularly to the production of new cyanoalkylaminochlorotriazines.

The cyanoalkylaminochlorotriazines of this invention may be represented by the formula

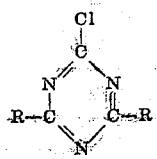

where one R represents

and the remaining R is selected from the group consisting of

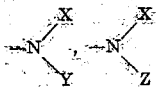

and amino, X being chosen from the group consisting of hydrogen, alkyl, cycloalkyl, aryl, and cyanoalkyl, Z being chosen from the group consisting of alkyl, cycloalkyl, aryl, and cyanoalkyl, and Y being cyanoalkyl.

Illustrative examples of the X, Y, and Z groups which have the meanings above given are:

For cyanoalkyl: cyanomethyl, β-cyanoethyl, γ-cyanopropyl, β-cyano-α-methylethyl, etc.

For alkyl: methyl, ethyl, propyl, isopropyl, butyl, allyl, hexyl, dodecyl, etc.

For cycloalkyl: cyclohexyl, cyclohexenyl, cyclopentyl, cycloheptyl, etc.

For aryl: phenyl, diphenyl, naphthyl, tolyl, xylyl, etc.

These cyanoalkylaminochlorotriazines are prepared by reacting an aminonitrile of the formula

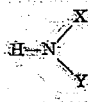

where X and Y have meanings above given, with chlorotriazines of the formulae

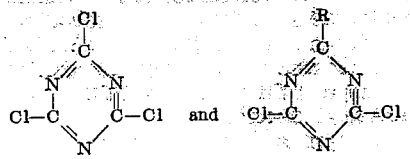

where R is chosen from the group consisting of

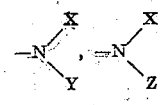

and amino, where X, Y, and Z have the meanings above given.

Alternative methods for preparing these types of cyanoalkylaminochlorotriazines are those in which ammonia or an amine of the formula

where X and Z have the meanings above given, is reacted with triazines of the formula

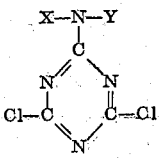

where X and Y have the meanings above given.

These cyanoalkylaminochlorotriazines may be prepared in a number of liquid media, and it is not necessary that the chlorotriazine for the reaction be completely in solution. However, if undissolved chlorotriazine is in suspension it is desirable to have the solid in a finely divided state so as to be more easily available for reaction.

In the preparation of the cyanoalkylaminochlorotriazines, hydrogen chloride is split off and must be removed from the reaction. This is accomplished by adding HCl-acceptors which include such materials as an excess of the amine used in the reaction, sodium bicarbonate, and sodium hydroxide. Other HCl-acceptors may be used with equal success, but for the sake of economy and easy availability, the above are preferred.

The cyanoalkylaminochlorotriazines herein described are useful in the manufacture of chemical intermediates, chemotherapeutic agents, dyes, insecticides, synthetic resins, plastics, and other materials in which substituted triazines carrying cyanoalkylamino groups are desirable. The following examples will illustrate the preparation of typical cyanoalkylaminochlorotriazine materials herein described.

EXAMPLE 1

*Preparation of 2-chloro-4,6-bis-cyanomethyl-amino-1,3,5-triazine*

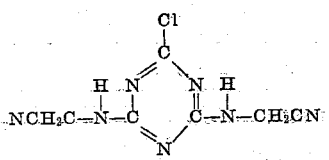

| Reactants | Molar Ratio |
|---|---|
| Cyanuric chloride | 1.0 |
| Acetone | 7.8 |
| Glycinonitrile | 2.0 |
| Sodium bicarbonate | 2.0 |

The glycinonitrile is added to the acetone solution of the cyanuric chloride at a rate that does not permit the temperature to rise above 20° C. An ice bath may be useful to control the reaction temperature. After the glycinonitrile is added, solid sodium bicarbonate is added carefully and the mixture is stirred until the liberation of carbon dioxide is complete. A large amount of cold water is added to the reaction mixture. The sodium chloride formed in the reaction dissolves, and the desired triazine precipitates. After recovery and purification the colorless, odorless, crystalline solid melts at 275-280° C. This compound is soluble in 2-ethoxy-ethanol-1, herein and after referred to as Cellosolve, and water, but insoluble in most other solvents.

EXAMPLE 2

Preparation of 2-chloro-4,6-bis-β-cyanoethyl-butylamino-1,3,5-triazine $$\begin{array}{c}\text{Cl}\\|\\\text{C}\\//\ \ \backslash\backslash\\\text{N}\ \ \ \ \text{N}\\\text{H}_9\text{C}_4\diagdown\ \ \ \ \ \ \ \ \diagup\text{C}_4\text{H}_9\\\text{N--C}\ \ \ \ \text{C--N}\\\text{NCH}_4\text{C}_2\diagup\ \ \backslash\backslash\ \diagup\ \ \diagdown\text{C}_2\text{H}_4\text{CN}\\\text{N}\end{array}$$

| Reactants | Molar Ratio |
|---|---|
| Cyanuric chloride | 1.0 |
| Acetone | 12.3 |
| β-Butylaminopropionitrile | 2.0 |
| Sodium bicarbonate | 2.0 |
| Water | 22.0 |

The aminonitrile is added to the acetone solution of cyanuric chloride at such a rate that gentle refluxing is maintained. When the addition of the aminonitrile is complete, the aqueous sodium bicarbonate is added at such a rate that the evolution of carbon dioxide will not be vigorous. The reaction mixture is then heated under reflux at 70° C. for 2 hours. The reaction mixture is then poured into water, and an oil separates. This oil solidifies, and after recovery and recrystallization from alcohol the colorless, odorless, crystalline solid melts at 75-76° C. This compound is soluble in most organic solvents, but insoluble in water.

EXAMPLE 3

Preparation of 2-chloro-4,6-bis-di-β-cyanoethylamino-1,3,5-triazine $$\begin{array}{c}\text{Cl}\\|\\\text{C}\\//\ \ \backslash\backslash\\\text{N}\ \ \ \ \text{N}\\(\text{NCH}_4\text{C}_2)_2\!\!=\!\!\text{N--C}\ \ \ \ \text{C--N}\!\!=\!\!(\text{C}_2\text{H}_4\text{CN})_2\\\diagdown\ \ \diagup\\\text{N}\end{array}$$

| Reactants | Molar Ratio |
|---|---|
| Cyanuric chloride | 1.0 |
| Acetone | 13.6 |
| Iminodipropionitrile | 2.0 |
| Sodium hydroxide | 2.0 |
| Water | 22.0 |

The iminodipropionitrile is added to the acetone solution of cyanuric chloride at 20-30° C. The sodium hydroxide solution is added carefully when the amine addition is complete, and the temperature is allowed to reach 50° C. A volume of water equal to that of the acetone is added, and the reaction is heated for 1 hour to distill off the acetone. When the temperature reaches 90° C. the reaction mixture is cooled so that the product will crystallize from solution. After recovery and recrystallization from ethylene dichloride the colorless, odorless, crystalline solid melts at 162-165° C. This compound is soluble in benzene, ethylene dichloride, alcohol, acetone, and insoluble in water.

EXAMPLE 4

Methods of preparing 2-amino-4-chloro-6-cyanomethylamino-1,3,5-triazine

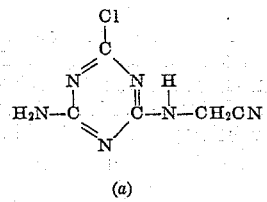

(a)

| Reactants | Molar Ratio |
|---|---|
| 2-amino-4,6-dichloro-1,3,5-triazine | 1.0 |
| Acetone | 7.8 |
| Glycinonitrile | 1.0 |
| Sodium bicarbonate | 1.0 |
| Water | 22.0 |

The aminonitrile is added to the acetone solution of the aminodichlorotriazine so that the temperature range is 20-30° C. The aqueous sodium bicarbonate solution is added at the same temperature range, and after the evolution of the carbon dioxide is complete the reaction mixture is heated for 1-2 hours at 60-70° C. The reaction mixture is diluted with a large volume of water and the desired triazine precipitates. After recovery and recrystallization from aqueous dioxane the colorless, odorless, crystalline solid decomposes at 260° C. without a definite melting point. This compound is soluble in dioxane, and alcohol, but insoluble in water.

(b)

| Reactants | Molar Ratio |
|---|---|
| 2,4-dichloro-6-cyanomethylamino-1,3,5-triazine | 1.0 |
| Aqueous ammonia, conc. | 2.0 |
| Acetone | 6.8 |

The triazine is dissolved in the acetone and the aqueous ammonia is added carefully. The reaction is exothermic, but the temperature is kept below 30° C. by the occasional application of an ice bath. When the exothermic reaction ceases, the solid which separates is recovered and purified, and it is identified as the desired triazine.

While the invention has been described with particular reference to specific embodiments, it is to be understood that it is not to be limited thereto but is to be construed broadly and restricted solely by the scope of the appended claims.

What is claimed:
1. A compound of the formula

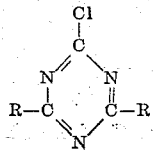

where at least one R is a cyanoalkylamino radical and the remaining R is selected from the group consisting of amino, alkylamino, cycloalkylamino, and arylamino.

2. A method of preparing a compound of the formula

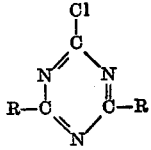

where at least one R is a cyanoalkylamino radical and the remaining R is selected from the group consisting of amino, alkylamino, cycloalkylamino, and arylamino, which comprises reacting a cyanoalkylamine with a compound of the formula

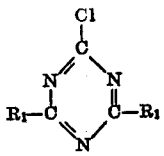

where at least one $R_1$ is a chlorine radical and the remaining $R_1$ is selected from the group consisting of amino, cyanoalkylamino, alkylamino, cycloalkylamino and arylamino.

3. 2-chloro-4,6-bis - cyanomethylamino-1,3,5-triazine of the formula

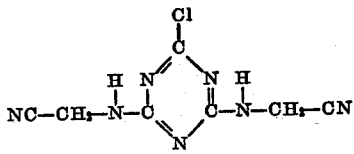

4. A method of preparing 2-chloro-4,6-bis-cyanomethylamino-1,3,5-triazine which comprises reacting gylcinonitrile with cyanuric chloride the nitrile being employed in the proportion of about two mols to one mol of the cyanuric chloride, and recovering the 2-chloro-4,6-bis-cyanomethylamino-1,3,5-triazine obtained.

5. A method of preparing 2-chloro-4,6-bis-cyanomethylamino-1,3,5-triazine which comprises reacting glycinonitrile with an aqueous acetone solution of cyanuric chloride the nitrile being employed in the proportion of about two mols to one mol of the cyanuric chloride at a temperature below 90° C., and recovering the 2-chloro-4,6-bis - cyanomethylamino-1,3,5-triazine obtained.

6. 2-chloro-4,6-bis - di - β - cyanoethylamino-1,3,5-triazine of the formula

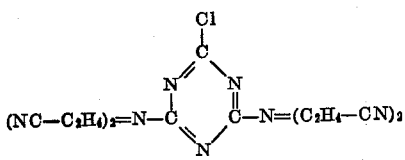

7. A method of preparing 2-chloro-4,6-bis-di-β-cyanoethylamino-1,3,5-triazine which comprises reacting iminodipropionitrile with cyanuric chloride the nitrile being employed in the proportion of about two mols to one mol of the cyanuric chloride, and recovering the 2-chloro-4,6-bis-di-β-cyanoethylamino-1,3,5-triazine obtained.

8. A method of preparing 2-chloro-4,6-bis-di-β-cyanoethylamino-1,3,5-triazine which comprises reacting iminodipropionitrile with an aqueous acetone solution of cyanuric chloride the nitrile being employed in the proportion of about two mols to one mol of the cyanuric chloride at a temperature below 90° C., and recovering the 2-chloro-4,6-bis-di - β - cyanoethylamino - 1,3,5-triazine obtained.

9. 2-amino - 4 - chloro - 6-cyanomethylamino - 1,3,5-triazine of the formula

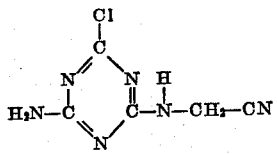

10. A method of preparing 2-amino-4-chloro-6-cyanomethylamino-1,3,5-triazine which comprises reacting glycinonitrile with 2-amino-4,6-dichloro-1,3,5-triazine the nitrile being employed in the proportion of one mol to one mol of triazine, and recovering the 2-amino-4-chloro-6-cyanomethylamino-1,3,5-triazine obtained.

11. A method of preparing 2-amino-4-chloro-6-cyanomethylamino-1,3,5-triazine which comprises reacting glycinonitrile with an aqueous acetone solution of 2-amino-4,6-dichloro-1,3,5-triazine the nitrile being employed in the proportion of one mol to one mol of triazine at a temperature below 90° C., and recovering the 2-amino-4-chloro-6 - cyanomethylamino-1,3,5-triazine obtained.

INGENUIN HECHENBLEIKNER.

REFERENCES CITED

The following references are of record in the file of this patent:

Chemical Abstracts, vol. 31, p. 1010.
Compte Rendu, vol. 203 (1936), pp. 568-70.